US006690779B2

(12) United States Patent
Walker et al.

(10) Patent No.: US 6,690,779 B2

(45) Date of Patent: *Feb. 10, 2004

(54) METHOD AND APPARATUS FOR AWARDING AND REDEEMING PREPAID TELEPHONE TIME

(75) Inventors: Jay S. Walker, Ridgefield, CT (US); James A. Jorasch, Stamford, CT (US); Stephen C. Tulley, Fairfield, CT (US); Geoffrey M. Gelman, Stamford, CT (US); Magdalena M. Fincham, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 151 days.

This patent is subject to a terminal disclaimer.

(21) Appl. No.: 09/965,328

(22) Filed: Sep. 27, 2001

(65) Prior Publication Data

US 2002/0131571 A1 Sep. 19, 2002

Related U.S. Application Data

(60) Continuation-in-part of application No. 09/044,882, filed on Mar. 20, 1998, now Pat. No. 6,368,215, and a continuation-in-part of application No. 09/044,881, filed on Mar. 20, 1998, now Pat. No. 6,377,669, and a continuation-in-part of application No. 09/045,952, filed on Mar. 23, 1998, now Pat. No. 6,327,351, which is a division of application No. 08/820,500, filed on Mar. 19, 1997, now Pat. No. 5,909,486.

(51) Int. Cl.[7] ...................... H04M 15/00; H04M 17/00; H04M 11/00; A63F 9/22

(52) U.S. Cl. ............................. 379/144.01; 379/93.13; 379/112.01; 379/114.01; 379/144.05; 379/144.06; 463/20; 463/21

(58) Field of Search ........................... 379/93.13, 93.22, 379/111, 114.01, 114.11, 114.17, 114.24, 121.06, 127.01, 127.06, 112.01, 144.01, 144.05, 144.06; 463/20, 21

(56) References Cited

U.S. PATENT DOCUMENTS

| | | | | |
|---|---|---|---|---|
| 4,706,275 | A | 11/1987 | Kamil | 379/144 |
| 5,038,022 | A | 8/1991 | Lucero | 235/380 |
| 5,129,652 | A | 7/1992 | Wilkinson | 273/139 |
| 5,179,517 | A | 1/1993 | Sarbin et al. | 364/410 |
| 5,259,613 | A | 11/1993 | Marnell, II | 273/138 A |

(List continued on next page.)

FOREIGN PATENT DOCUMENTS

JP 4-307085 10/1992

OTHER PUBLICATIONS

Sweeney, James T., "State loses round in suit on video slots; Argument on phone card dispenser rejected", The San Diego Union–Tribune, Apr. 8, 1999, Section: News, pg. A–3.

Herman, Ken, "Gaming machines push the limits of legality; County attorney says devices are offering too–big payoffs", Austin American–Statesman, Aug. 2, 1996, Section News at pg. A1.

"DCI Telecommunications (DCIT) Electronic Bulletin Board", Business Wire, Feb. 15, 1995.

"More Dotmation' Slots Hit Town", Atlantic City Insider, Jan. 1997, vol. 1, pp. 1–16.

Grimes, Richard, "Player Cards at West Virginia Racetracks OK'D: Innovation Keeps Track Of Winnings Like Frequent Flier Cards", Charleston Daily Mail, Mar. 28, 1997, Section: News at pg. 6A.

(List continued on next page.)

*Primary Examiner*—Binh Tieu

(74) *Attorney, Agent, or Firm*—Magdalena M. Fincham

(57) ABSTRACT

A slot card issued by a slot club, or a membership card in another incentive award program, that is also capable of being used as phone calling card is provided. Free calling time is credited to the member's card account in response to the playing of the slot machine or utilizing the respective service. After incentive points are awarded, the member may use the membership card as a prepaid phone calling card, whereby the member's account is debited for the cost of the call.

22 Claims, 6 Drawing Sheets

U.S. PATENT DOCUMENTS

| | | | | |
|---|---|---|---|---|
| 5,265,874 | A | 11/1993 | Dickinson et al. | 273/138 A |
| 5,290,033 | A | 3/1994 | Bittner et al. | 273/138 A |
| 5,321,241 | A | 6/1994 | Craine | 235/380 |
| 5,332,076 | A | 7/1994 | Ziegert | 194/217 |
| 5,333,186 | A | 7/1994 | Gupta | 379/201 |
| 5,353,335 | A | 10/1994 | D'Urso et al. | 379/67 |
| 5,359,642 | A | 10/1994 | Castro | 379/121 |
| 5,429,361 | A | 7/1995 | Raven et al. | 273/138 A |
| 5,456,648 | A | 10/1995 | Edinburg et al. | 482/4 |
| 5,469,497 | A | 11/1995 | Pierce et al. | 379/115 |
| 5,488,411 | A | 1/1996 | Lewis | 348/8 |
| 5,504,808 | A | 4/1996 | Hamrick, Jr. | 379/144 |
| 5,559,312 | A | 9/1996 | Lucero | 235/380 |
| 5,608,785 | A | 3/1997 | Kasday | 379/90 |
| 5,639,088 | A | 6/1997 | Schneider et al. | 273/138.2 |
| 5,719,926 | A | 2/1998 | Hill | 379/113 |
| 5,735,379 | A | 4/1998 | Schulze et al. | 194/346 |
| 5,799,947 | A | 9/1998 | Spector | 273/304 |
| 5,816,918 | A | 10/1998 | Kelly et al. | 463/16 |
| 5,909,486 | A | 6/1999 | Walker et al. | 379/144 |
| 5,941,771 | A | 8/1999 | Haste, III | 463/17 |
| 5,983,196 | A | 11/1999 | Wendkos | 705/14 |
| 6,003,013 | A | 12/1999 | Boushy et al. | 705/10 |
| 6,006,456 | A | 12/1999 | Hiromachi et al. | 40/124.01 |
| 6,007,426 | A | 12/1999 | Kelly et al. | 463/16 |
| 6,009,412 | A | 12/1999 | Storey | 705/14 |
| 6,014,439 | A | 1/2000 | Walker et al. | 379/266 |
| 6,113,493 | A | 9/2000 | Walker et al. | 463/25 |
| 6,113,495 | A | 9/2000 | Walker et al. | 463/42 |
| 6,139,431 | A | 10/2000 | Walker et al. | 463/20 |
| 6,229,879 | B1 | 5/2001 | Walker et al. | 379/88 |

OTHER PUBLICATIONS

"Welcome to the Players Club", website, (http://bigsky-brides com/playersclub/), download date: Apr. 26, 2000.

"Welcome to the Players Club", HTML Link, (Welcome to The Players Club.htm), download date: Apr. 26, 2000.

200

| MEMBER ID NUMBER | BIOGRAPHICAL INFORMATION | HISTORICAL USAGE INFORMATION | CURRENT ACCOUNT BALANCE |
|---|---|---|---|
| M 367 582 | FEMALE, AGE 58 | BRONZE PLAYER | 4 MIN. 28 SEC. |
| M 924 166 | MALE, AGE 47 | GOLD PLAYER | 18 MIN. 03 SEC. |
| M 753 056 | MALE, AGE 49 | GOLD PLAYER | 47 MIN. 32 SEC. |

FIG. 2

300

| CALL ID NUMBER | DATE OF CALL | TIME OF CALL | CALLED NUMBER | CALL DURATION | CARRIER'S MEMBER ID NUMBER |
|---|---|---|---|---|---|
| 203-555-1638 | 10/17/01 | 8:12 AM | 201-555-0639 | 2 MIN. 14 SEC. | C 002 |
| 212-555-9632 | 10/23/01 | 1:36 PM | 415-555-4902 | 9 MIN. 58 SEC. | C 002 |
| 212-555-8439 | 10/24/01 | 2:45 PM | 650-555-1288 | 7 MIN. 13 SEC. | C 004 |

FIG. 3

METHOD AND APPARATUS FOR AWARDING AND REDEEMING PREPAID TELEPHONE TIME

PRIORITY CLAIM

The present Application is a Continuation-In-Part Application of the following co-pending, commonly-owned U.S. Patent Applications, which are hereby incorporated by reference into the present Application in their entireties: (1) U.S. patent application Ser. No. 09/044,882, entitled METHOD AND APPARATUS FOR AWARDING AND REDEEMING PREPAID TELEPHONE TIME and filed Mar. 20, 1998 now U.S. Pat. No. 6,368,215 in the name of Walker et al.; (2) U.S. patent application Ser. No. 09/044,881, entitled METHOD AND APPARATUS FOR AWARDING AND REDEEMING PREPAID TELEPHONE TIME and filed Mar. 20, 1998 now U.S. Pat. No. 6,377,669 in the name of Walker et al.; and (3) U.S. patent application Ser. No. 09/045,952, entitled METHOD AND APPARATUS FOR AWARDING AND REDEEMING PREPAID TELEPHONE TIME and filed Mar. 23, 1998 U.S. Pat. No. 6,327,351 in the name of Walker et al. Each of the above applications is a Divisional Application of commonly-owned U.S. patent application Ser. No. 08/820,500, entitled METHOD AND APPARATUS FOR AWARDING AND REDEEMING PREPAID TELEPHONE TIME and filed Mar. 19, 1997, which issued Jun. 1, 1999 as U.S. Pat. No. 5,909,486.

BACKGROUND OF THE INVENTION

1. Field of the Invention

The present invention relates generally to a system for awarding prizes to members of an incentive program, such as a casino slot club, and more particularly, to a system for utilizing the membership card for such an incentive program as a prepaid phone calling card to award and redeem points to a member in the form of prepaid time for a telecommunications service.

2. Background of the Invention

Slot machines, such as video poker, reel machines, video keno or video blackjack devices (hereinafter, collectively referred to as "slot machines"), are an important source of income for the gaming industry. Despite the fact that the odds generally favor the casino, players still play slot machines in large numbers, in hopes of hitting a large jackpot, as well as for their entertainment value.

Each slot machine is designed to ensure that, on average, the casino retains a predetermined percentage of the total amount gambled (the house advantage or "vigorish"). In fact, slot machines generally have a higher house advantage than the table games of blackjack, poker or craps. Thus, the more these slot machines are played, the greater the revenue to the casino.

Accordingly, casinos constantly search for marketing strategies and programs to appeal to players and to distinguish their slot machines from competitors in the industry. For example, as an added incentive to play their slot machines, many casinos offer "slot club" programs to reward slot machine players. Each player in a slot club is generally issued a player tracking card encoded with the players' tracking identifier. The casino awards "player reward points" for the player as he plays slot machines in that casino. The "player reward points" can generally be redeemed for merchandise or services at the casino hotel.

In many cases, however, the incentive provided by conventional slot club programs may not be sufficient to attract new players or to retain existing casino players at slot machines. With conventional slot club programs, for example, the player reward points must typically be exchanged for merchandise and services at the casino hotel. Thus, once the player has left the casino, the player has limited options for redeeming the points in a convenient manner.

In addition, although it would be desirable for casinos to give a small, immediate and affordable reward to a player for his continued play, conventional slot machines can only pay out an integral numbers of coins. Thus, a small reward of a fractional amount of less than one coin is impractical with conventional systems. If a casino could cost-effectively provide an award to players every time the player pulls the handle, the slot machine may be advantageously promoted as providing a "win for every spin."

It is well known for vendors to sell prepaid calling cards for telephone calls at a fixed or standard rate. Such prepaid calling cards may allow, for example, the caller to call anywhere in the United States at any time of the day for a rate of 16 cents per minute, with a correspondingly higher rate charged for international calls. In addition, "rechargeable" prepaid calling cards are known which may be recharged by purchasing additional time, generally in blocks of minutes. Since the prepaid calling card is merely a pointer to an account maintained by the vendor, the card itself is not necessarily required to make a telephone call. There are no known prepaid calling cards, however, which allow minutes to be accumulated as an incentive award for the use of a particular service.

One casino slot card club offers a separate "giveaway" prepaid calling card, having a predefined value, as an incentive to join the club. However, this additional card simply acts as a standard prepaid calling card, and does not function as a slot card. Once the prepaid calling time is used up, the prepaid calling card cannot be refreshed by slot usage. Moreover, none of the known slot cards permit the accumulated bonus points to be redeemed for free phone time.

SUMMARY OF THE INVENTION

Generally, to overcome the above-described problems, the present invention provides a method and apparatus for awarding and redeeming telephone time to a member of an incentive award program, such as a slot club. In accordance with one embodiment of the present invention, a user identifier that identifies a user of at least one slot machine is determined, the usage of the at least one slot machine by the user is determined, an award of telephone time based on the usage of the at least one slot machine is determined, and the award of telephone time is stored in association with the user identifier. In accordance with another embodiment of the present invention a request to establish a telephone call is received, wherein the request includes an identifier that identifies a user and a telephone number to be called; the telephone call is established, based on the telephone number; and an amount of telephone time associated with the user identifier is adjusted based on a cost of the telephone call, wherein the telephone time was awarded for usage of at least one slot machine.

BRIEF DESCRIPTION OF THE DRAWINGS

These and other features and advantages of the present invention can best be understood by reference to the detailed description of the preferred embodiments set forth below taken with the drawings, in which:

FIG. 2 depicts a member database for maintaining information associated with each member of the reward program, for use in the first embodiment of the present invention.

FIG. 3 depicts a calls record database for maintaining information on each telephone call processed by the system of FIG. 1, for use in the first embodiment of the present invention.

DETAILED DESCRIPTION OF THE INVENTION

Figure 1:
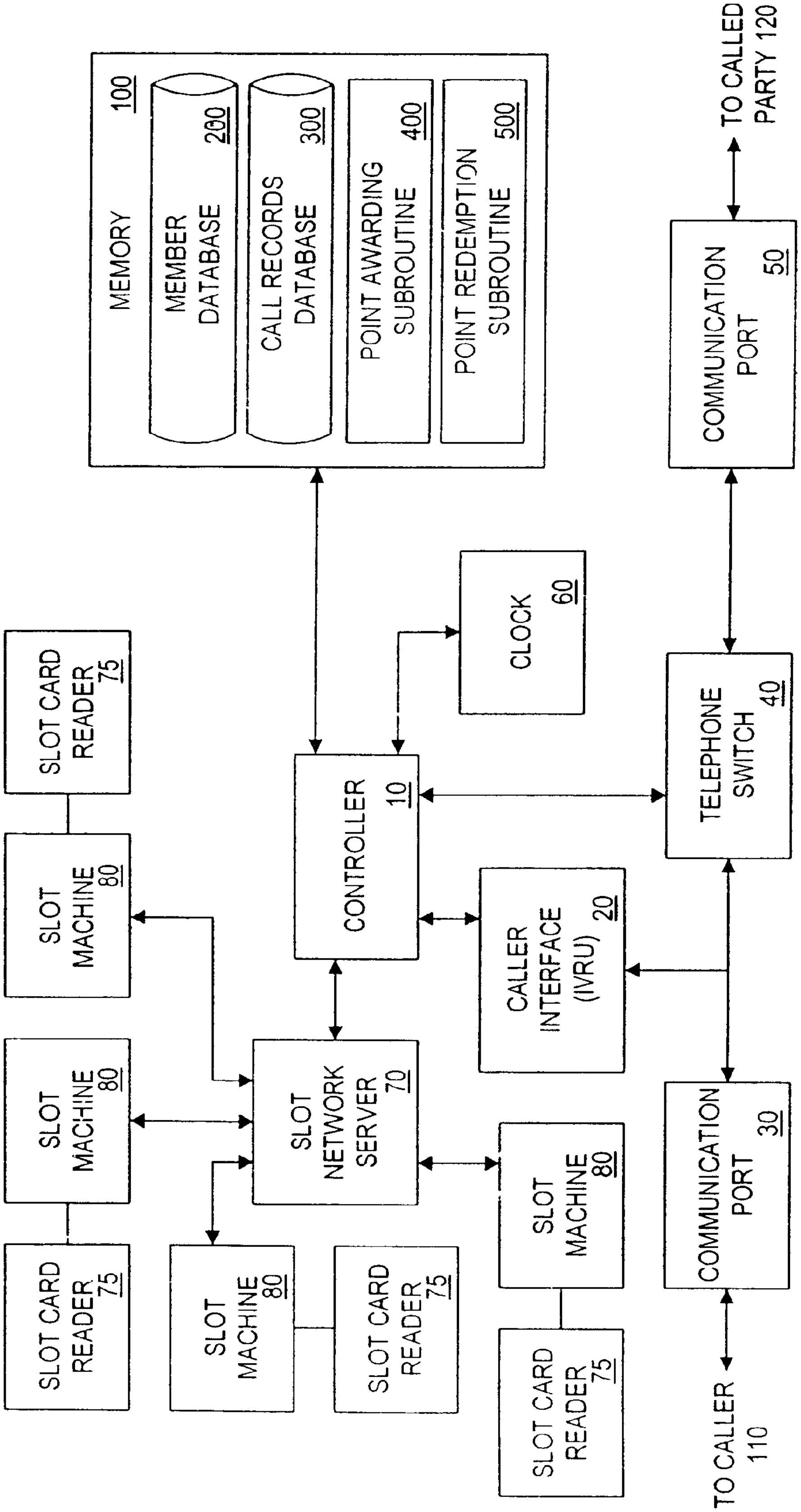
FIG. 1 is a block diagram illustrating a prepaid phone card reward program system according to a first embodiment of the present invention.

According to one feature of the present invention, a slot card issued by e.g., a slot club, or a membership card in another incentive award program, may be used as a prepaid phone calling card. In one embodiment, prepaid telephone time may be provided to a slot machine player as an immediate and low-cost reward for the continued playing of a slot machine. When a player plays at a slot machine or other electronic gaming device and inserts his slot card, the player can be credited with free telephone time even in small increments valued below the minimum win payout.

In another embodiment, a player may earn telephone time based on factors other than the continued play of a slot machine. For example, telephone time may be awarded to a player based on (i) an amount of a payout obtained by the player, (ii) a number of non-winning outcomes obtained by the player, (iii) an amount of wagering credit input by the player into the slot machine, (iv) a symbol obtained by the player during play of the slot machine, (v) a score or game level attained by a player, and/or (vi) a time at which the player plays the slot machine.

For example, in an embodiment wherein a player earns telephone time based on the time at which the player plays the slot machine, the casino may award telephone time in a manner intended to encourage players to play slot machines at certain "off peak" times and thus shift such peak times. One manner of encouraging players to play at "off-peak" times is to provide players with double the amount of telephone time that would otherwise be awarded if the player is playing at a predetermined time determined to be favorable to the casino. For example, a player may be awarded double the telephone time otherwise awarded at 2:00am–6:00am on weekdays.

In such embodiments the time that is determined to be favorable to the casino and thus warrants an award of extra telephone time may be determined ad hoc. For example, players may be awarded additional telephone time for playing when less than ten percent (10%) of the slot machines in the casino are in use. The casino may communicate that such a time is in progress and that slot club members are eligible to earn extra telephone time by, for example, announcing such times over a speaker or video monitor in the casino or displaying such a condition on at least one slot machine in the casino.

The free telephone time may be credited to the player's slot card account in the casino's database or in a telephone service provider database. The free telephone time may optionally be displayed on a video monitor associated with the slot machine, thus allowing the player to see and track his rewards as he receives them.

The slot card, or a membership card in another incentive award program, may be later used as a prepaid phone card to place a telephone call. In one embodiment, the player simply dials a telephone number, for example, an "800" toll-free number, printed on the back of the card. That call is received by a caller interface, such as an interactive voice response unit, which queries the player for his slot card identifier and the desired telephone number to be called. Once that information is entered by the player, a controller matches the identifier to the player's account in, e.g., the casino's database, which contains an indication of an amount of free telephone time associated with the player. If the identifier matches a valid account and sufficient telephone time has been credited to the account, the controller then causes a telephone switch to place the call to the entered telephone number. The call will continue until the account balance has been depleted or the call is disconnected by either party. The controller debits the player's account for the time of the call.

The present invention provides the players a reward for playing the machine, from a fraction of 1 second of telephone time up to, e.g., a few minutes or more. Since each second of phone time can be purchased at a relatively low cost, for example 0.2 cents, free telephone time is an affordable reward for the casino. Moreover, free telephone time, and the accumulation thereof, is a flexible reward, and is easily understood and redeemed, thus providing players a strong incentive to play the slot machines longer, or even to choose a casino which offers this reward over another that does not.

In some embodiments of the present invention a player may have to qualify for the ability to earn telephone time in addition to or instead of registering with a slot club. For example, a player may have to subscribe to a predetermined telephone provider, be a registered member of a predetermined organization, or frequent the casino at least a predetermined amount of times within a predetermined period of time in order to be eligible to earn telephone time for usage of a slot machine. In other embodiments, rather than qualifying a player for earning telephone time per se, such qualifications may instead be a factor in determining how much telephone time the player should be awarded. For example, a player that frequents the casino at least six (6) times a year may be awarded twenty (20) seconds of telephone time per handle pull while a player that frequents the casino less than six (6) times per year maybe awarded ten (10) seconds of telephone time per handle pull.

Additionally, there may be more than one type of telephone time available to a player. For example, a player may be awarded domestic minutes (e.g. redeemable for calls throughout the continental United States) and/or international telephone time (e.g. redeemable for calls to anywhere outside the continental United States). A player may be awarded amounts of one or more such type of telephone time.

This system is for awarding free telephone time for using a service, such as a slot machine, and for redeeming that time. The term "slot machine" as used herein refers to any programmable gaming terminal controlling a random number generator or random event, including traditional slot machines, video bingo, video keno, video poker and video blackjack devices. Of course, the system is not limited to use with slot machines, but may also be used with table games, such as blackjack, craps, poker, sports book, keno and bingo. Further, the present invention is not limited to play at "bricks and mortar" casinos but also encompasses play at online casinos. When used with table games, the free telephone time is typically awarded by a casino employee who monitors the player's activity and allocates the time to the player's account. Further, the service may be non-casino related, such as a travel service, where instead of free miles, the traveler is provided with free telephone time. It should be noted that table games implement a player tracking system which is very similar to that used by slot machines. When a player initiates play at a gaming table, he presents his player tracking card to casino personnel who then insert that card into a player tracking reader. As is the case with the system used with slot machines, the information on the card is then transmitted to a network server. Based on, e.g., the length of play and increments of wagers, points are awarded to the player as play continues.

According to a feature of the invention, discussed further below, telephone time may be awarded to a player in accordance with casino-specific rewards criteria which determines the amount of telephone time to be awarded (i) as an incentive reward for playing the slot machine, (ii) as a payout in lieu of a traditional payout (for example, certain slot machines may award five seconds of telephone time for two oranges on the first two reels), or (iii) as a supplement to the traditional payout (for example, certain slot machines may award three dollars ($3) and five seconds of telephone time for two cherries).

FIG. 1 is a block diagram illustrating a prepaid phone card reward program system according to a first embodiment of the present invention. The casinos, or the known gambling venues, house the slot machines 80, each slot machine having connected thereto or integrated therewith a slot card reader 75.

The slot machines 80 are preferably networked to a slot network server 70, as shown in FIG. 1. It is noted that if a slot network server 70 is not utilized, the functionality provided by the network server 70 for awarding player reward points, as discussed below, could be provided directly in the slot machines 80, as would be apparent to a person of ordinary skill. The slot machines 80 and slot network server 70 transmit digitally encoded data and other information between one another. The transmitted data and other information may represent player name and identifier, play results, and authenticated player identification. The communications link between the slot network server 70 and the slot machines 80 preferably comprises a cable or wireless link on which electronic signals can propagate.

The slot network server 70 is connected to a system controller 10. The system controller 10 may be embodied as a single processor, or a number of processors. Memory 100 is operable to store one or more instructions, as discussed below in conjunction with FIGS. 4 and 5, which the system controller 10 is operable to retrieve, interpret and execute. The system controller 10 preferably includes a control unit, an arithmetic logic unit (ALU), and a CPU local memory storage device, such as, for example, a stackable cache or a plurality of registers, in a known manner. The control unit is operable to retrieve instructions from the memory 100. The ALU is operable to perform a plurality of operations needed to carry out instructions. The CPU local memory storage device is operable to provide high speed storage used for storing temporary results and control information.

The controller 10 is connected to a system clock 60, and to memory 100. As discussed below in conjunction with FIGS. 2 and 3, respectively, the memory 100 includes a member database 200, which stores information on each player enrolled in the slot club program, and a call records database 300, which stores information on each telephone call processed by the system. Memory 100 also contains computer readable programs comprising a point awarding subroutine 400 and point redemption subroutine 500, discussed below in conjunction with FIGS. 4 and 5, respectively. Memory 100 may physically comprise a RAM or other computer storage device, such as a hard disk drive or a floppy disk drive, for storing the databases and the programs. The programs may also be separately stored in ROM. The controller 10 is also connected to a caller interface 20, such as an interactive voice response unit (IVRU), which in turn is connected to both a first communication port 30 for receiving a call on line 110, preferably toll-free, from the player, and a telephone switch 40. The telephone switch 40 is also connected to a communication port 50 for placing a call from the player to a called party on line 120. The operation of the system will be described in more detail below.

When a player joins a slot club program, the casino typically issues the player a slot card, encoded with a players' membership identifier, for example, by means of a magnetic strip or keypunch encoding. In addition, the casino opens a corresponding data record account for the player in its member database 200. When playing, the player selects a slot machine 80, and preferably inserts the slot card into the associated slot card reader 75. The slot card reader 75 reads the player's membership identifier off the magnetic strip or keypunch of the slot card and transmits the identifier to the slot network server 70. The slot network server 70 authenticates the player's membership account and causes the computerized system controller 10 to access the member database 200 in memory 100. The controller 10 matches the player's identifier to the player's data record account in the member database 200. The data record is used by the system to track and reward the player's slot playing, in a manner described further below.

Thus, in one embodiment, every time the player inserts a slot card and plays the slot machine 80, the controller 10 credits free telephone time in accordance with the predefined casino-specific rewards criteria, from a fraction of one (1) second to a few minutes or more, in the data record associated with the player's member identifier, as discussed below in conjunction with FIG. 4. By awarding seconds of time, rewards in fractional amounts of the minimum payout are possible. For example, 5 seconds of long distance telephone time to anywhere in the continental United States may cost the casino only a penny. Thus, if the minimum payout is 25 cents, 5 seconds of telephone time is only one-twenty-fifth of the minimum payout.

The amount of telephone time credited to the player's current account balance, in accordance with predefined casino-specific rewards criteria, may be based on any one of the following, or combination thereof: (1) an amount of currency played by the player of the slot machine, (2) an amount of currency the player has won from the slot machine, (3) an amount of time the player has played the slot machine, (4) a number of occurrences of a symbol obtained by the player while playing the slot machine, or (5) an amount of currency with which the player started playing the slot machine. If telephone time is awarded every time the player pulls the handle, the slot machine may be advantageously promoted as providing a "win for every spin."

Similarly, the present invention allows the casino to pay out an entire win in telephone time instead of coins or as a supplement to the traditional coin payout, and further permits payouts in non-integral multiples of the minimum win payout consisting of telephone time alone, or both telephone time and coins. For example, a thirty (30) cent win payout may be distributed as a quarter and twenty-five (25) seconds of telephone time. In this case, the twenty-five (25) seconds of telephone time is not a reward, but part of the payout—the player may still receive additional telephone time as a reward for simply playing or winning.

In some embodiments of the present invention telephone time may "expire" or be deducted from a player's balance. For example, if a player's frequency of outcomes in a session falls below a predetermined threshold or if the player obtains a predetermined outcome or symbol on the slot machine, the player's telephone time balance may be decremented by a predetermined amount. Also, if a player does not redeem awarded telephone time within a predetermined time period, such telephone time may be deemed as "expired" and be deducted from the player's balance of available telephone time.

An example of member database 200 is shown in FIG. 2, wherein a data record comprises the member's identifier, optional biographical information (such as name, address, home telephone number, room number and credit card numbers), historical usage information, and current account balance. Historical usage information may optionally be used by the casino in determining the value of the award offered to the player. Preferably, the current account balance is also displayed to the player on a video monitor associated with the slot machine, thus allowing the player to see and track his free telephone time as it is rewarded. As stated above, a telephone time reward can also be awarded directly into the player's account by a casino employee.

In order to redeem the telephone time, the player removes the slot card from the slot card reader and uses the card as a prepaid calling card, as discussed below in conjunction with FIG. 5. The player makes this phone call, e.g., using an "800" number printed on the back of the slot card. This call is received by the IVRU 20, via the communication port 30. Upon receipt of the call, the IVRU 20 prompts the player for his member identifier and the telephone number for the party to be called, and once entered by the player, sends this information to the controller 10. In other embodiments of the present invention the player may identify himself by providing information other than his member identifier. For example, the player may provide a credit card account number, a social security number, a driver's license number, or a biometric identifier such as a fingerprint or a voiceprint.

The controller 10 preferably confirms that the indicated identifier is valid and thereafter accesses the member database 200 to retrieve the current account balance. The controller 10 transmits the retrieved account balance to the IVRU 20. The IVRU 20 may then inform the player of the available telephone time.

If the current account balance is sufficient, the controller 10 then configures the telephone switch 40 to establish a telephone connection to a called party over line 120 via the second communication port 50. The switch connects the caller line 110 to the called party line 120. The call continues until discontinued by either the caller or called party, or until the account balance has been depleted.

In one embodiment of the present invention, the player may obtain additional telephone time in order to continue the telephone call by accepting an offer provided by controller 10. The offer may comprise, e.g., a future commitment offer such that the player will receive additional telephone time in exchange for agreeing to perform an activity in the future. An acceptance of such an offer may be financially secured (e.g. the player will be charged a penalty if he or she does not perform the activity as agreed). The activity may be associated with the casino or with another entity. For example, the activity may be the making of a reservation to stay at the casino hotel for at least three nights within the following six months. Alternatively, the activity may be switching long-distance telephone providers. In one embodiment the player may obtain additional telephone time if the party being called accepts a future-commitment offer. A player may also be awarded telephone time if, e.g., the player and/or the party being called agrees to accept a specified number of telemarketer calls in the future.

The controller 10 causes the data record in the call records database 300 associated with the player's member identifier to be debited by an amount equal to the duration of the call. Alternatively, the player may be presented with an offer that allows the player to keep at least some of the telephone time that is to be debited in exchange for, e.g., accepting a future-commitment offer. In some embodiments, the player may be presented with an offer, either before or after the telephone call is established, to route the player to the reservation or customer service desk of the casino.

Alternatively, the current account balance may be maintained in units of money, for example, fractions of a cent, as opposed to seconds or minutes. For example, when the player is awarded player reward points, the controller 10 credits the player's account with 0.2 cents. In this example, when the player uses the slot card as a prepaid calling card, the cost of the telephone call, rather than its duration, is debited from the player's account. The controller 10 can calculate the cost of the call by known ways in the telephone service art. For example, a geographically variable per minute rate can be implemented by including a rate database which provides the per minute rate for the area code of the dialed number. The player's account is then debited by an amount equal to the rate corresponding to the dialed number times the duration of the call. In addition, if the player's credit card number is input into the member database 200, the player may be given an option to continue the call beyond the total rewarded telephone time, by allowing the system to charge his credit card account.

FIG. 3 depicts a calls record database for maintaining information on each telephone call processed by the system of FIG. 1. Each call record includes the caller identifier, date and time of the call, called number, call duration and the phone service carrier's member identifier.

As will be understood by one of ordinary skill in the art, the redemption functionality, discussed below in conjunction with FIGS. 5A and 5B, can be provided by the proprietor of the slot incentive reward program or by an independent third-party prepaid phone service vendor. If telephone time redemption is provided by the former, that is, by the casino itself, then the slot network server 70 and the controller 10 of FIG. 1 could use the same computer processor and share the same memory. In an embodiment where the telephone time redemption is performed by an independent third-party phone service vendor, the updates to the member database 200 by the casino to award newly earned player reward points are batched by the casino for transmission to the third-party phone service vendor or provided via a continuous online connection.

For example, in one embodiment the casino pre-pays for a block of prepaid telephone minutes (e.g. 10,000 minutes). The phone service vendor stores an indication of the amount of minutes purchased by the casino. As a player earns telephone time for usage of a slot machine, the casino may communicate to the phone service vendor the player's identifier and the amount of telephone time to be stored in association with the player identifier. In such an embodiment the phone service vendor may deduct the amount of telephone time to be stored in association with the player identifier from the amount of prepaid telephone time purchased by the casino. In other embodiments the casino may be billed for the amount of minutes allocated to players at the request of the casino, e.g. on a periodic basis. For example, each time a player is awarded telephone time the casino may communicate with the phone service vendor and request that a specified amount of telephone time be stored in association with a specified player identifier. The casino will store such telephone time for subsequent redemption by the player identified by the player identifier associated with the telephone time. Then, at the end of every billing cycle, the phone service vendor may bill the casino for the total amount of telephone time provided to all players at the request of the casino. The bill may be for the amounts of telephone time stored in association with player identifiers or for the amounts of telephone time actually redeemed by players.

Figure 4:
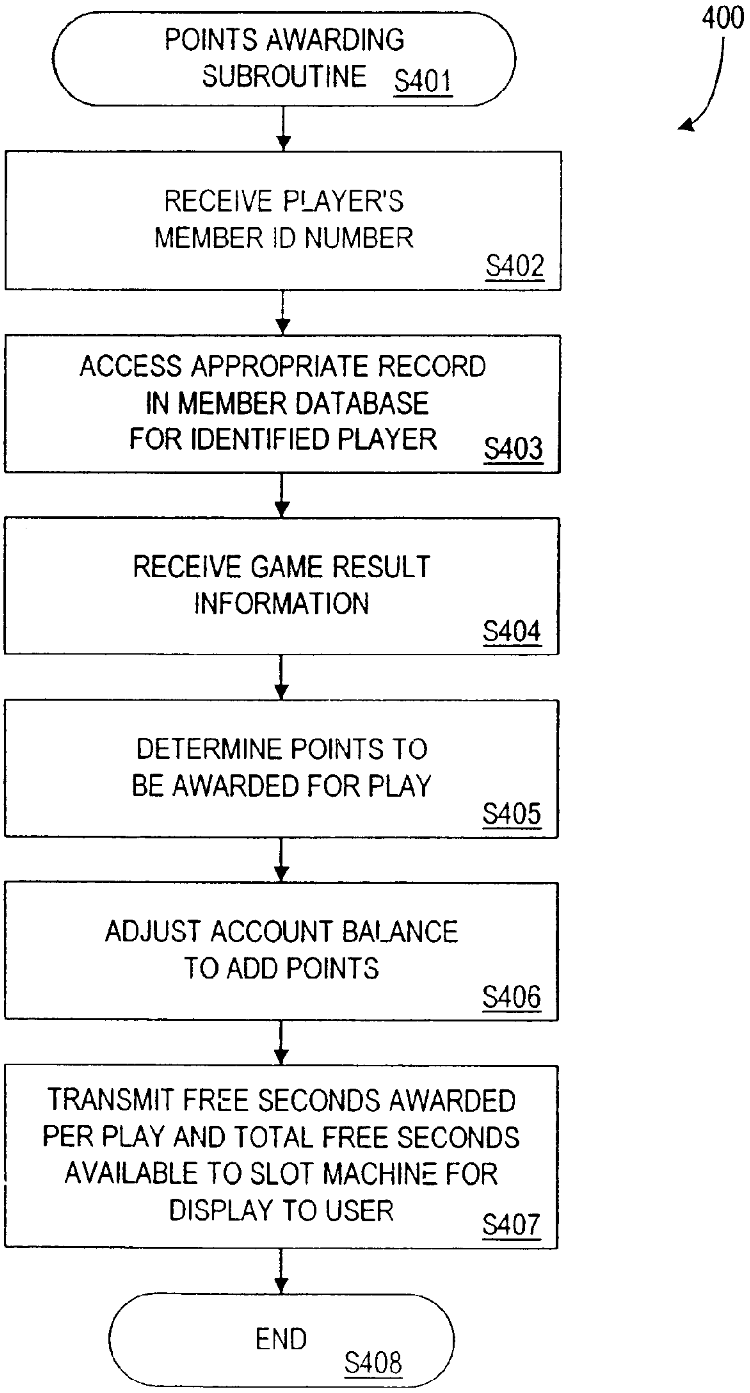
FIG. 4 is a flow chart describing an example of a point awarding subroutine for use by the system of FIG. 1 in the first embodiment of the present invention.

FIG. 4 is a flow chart describing an example of a point awarding subroutine 400 stored in memory 100 and accessed and executed by the controller 10 of FIG. 1. As described above, the points can correspond to, for example, either free telephone time in seconds or money in fractions of a cent. In step S401, the point awarding subroutine begins. In step S402, the controller 10 receives the player's membership identifier. In step S403, the controller 10 accesses the record in the member database 200 associated with the identifier. After receiving the game result information in step S404, the controller 10 determines how many points are to be awarded for the game play in step S405. In step S406, the controller 10 then adds the awarded points to the player's account balance in the member database 200. In step S407, the controller 10 then optionally sends the number of points, for example, seconds, rewarded for the game play and the total number of points in the player's account to the display driver for the display. The subroutine ends in step S408.

Figure 5A:
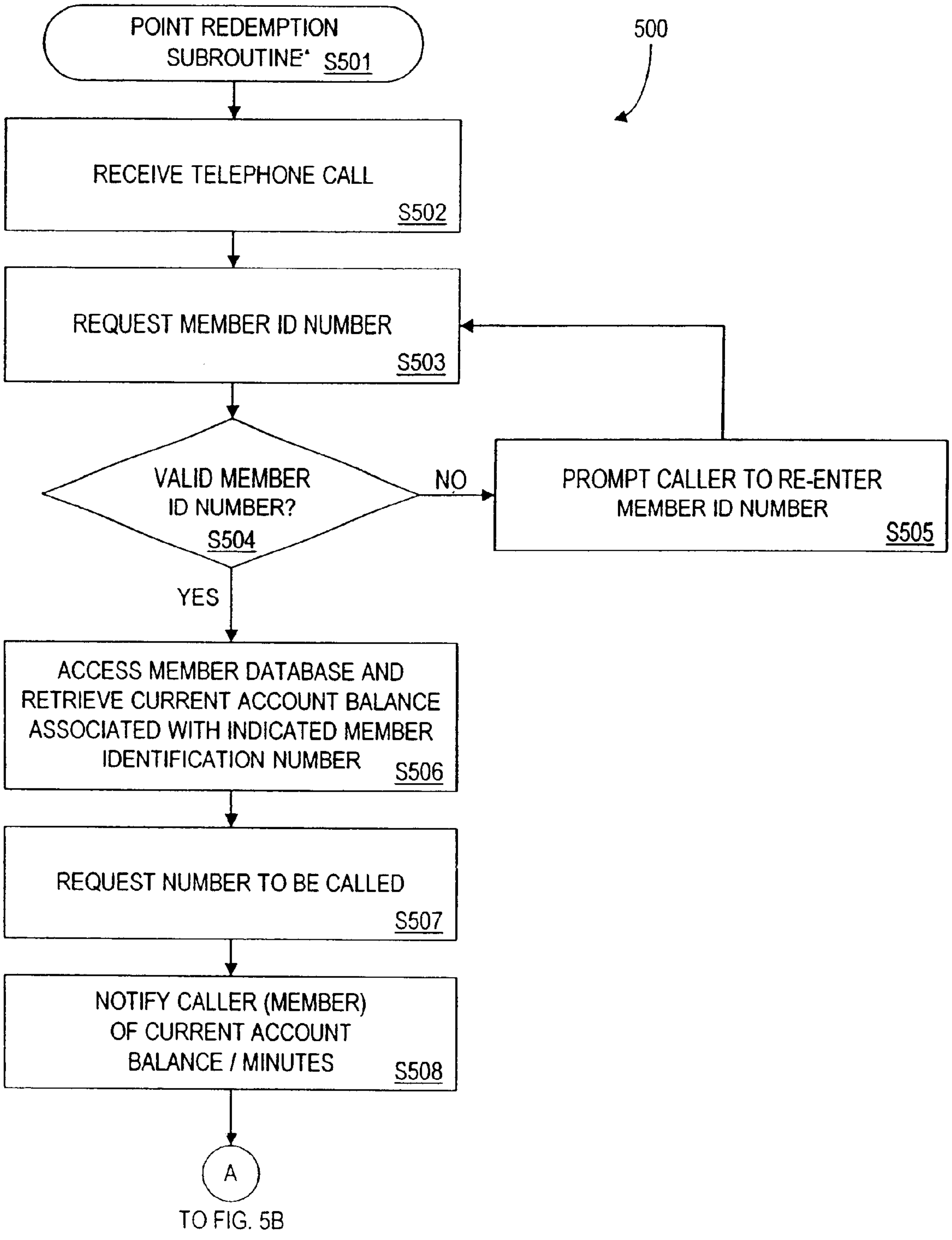
FIGS. 5A and 5B are flow charts describing an example of a point redemption subroutine for use by the system of FIG. 1 according to the first embodiment of the present invention.
Figure 5B:
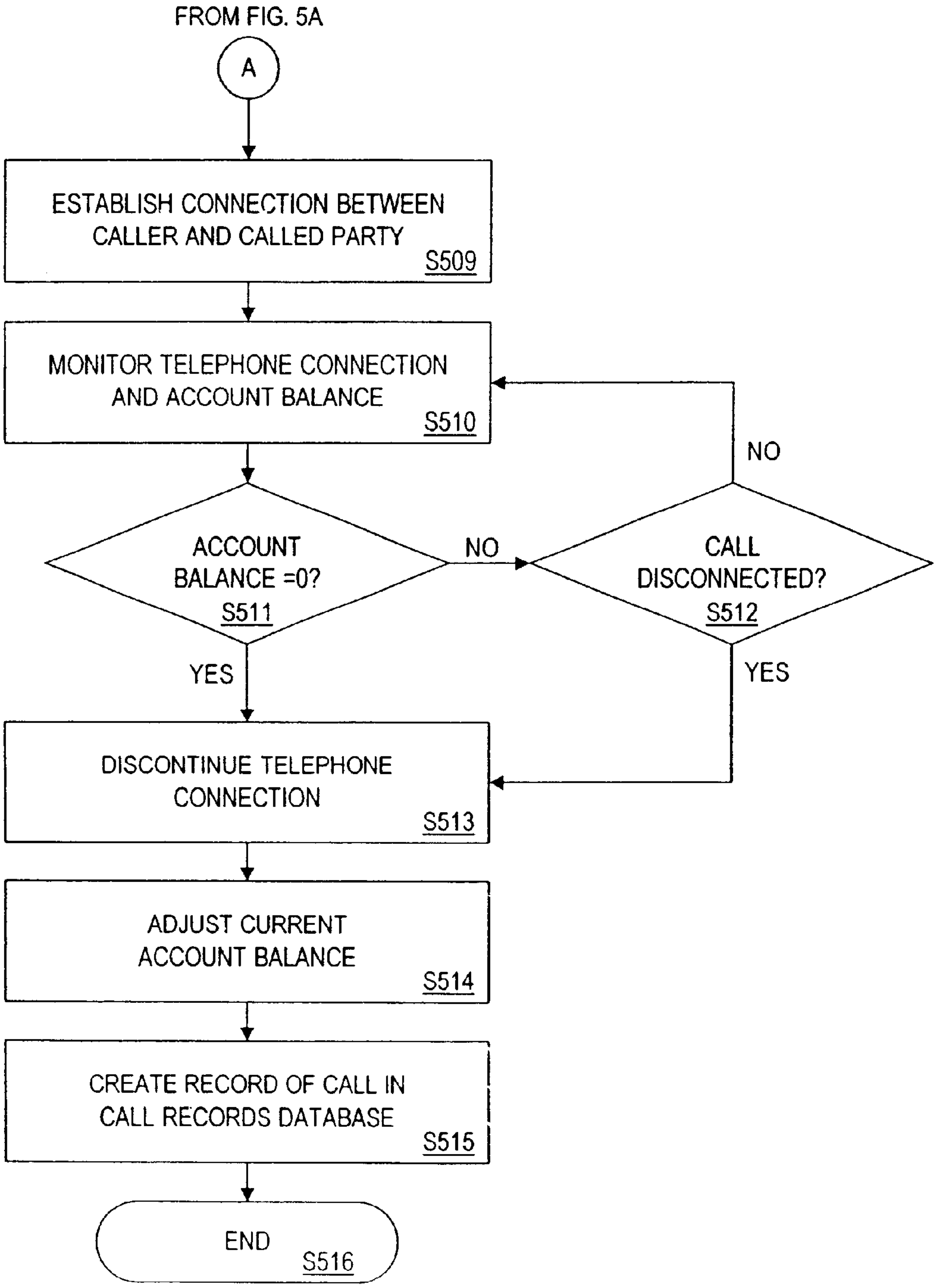

FIGS. 5A and 5B are flow charts describing an example of a point redemption subroutine 500 stored in memory 100 for use by the controller 10. The point redemption subroutine begins in step S501, and in step S502, the controller 10, via communication port 30 and IVRU 20, as described above, receives a telephone call from the player. In step S503, the controller 10 causes the IVRU 20 to prompt the player for the player's identifier. In step S504, the controller 10 checks the member database 200 to make sure the identifier is valid. If not, in step S505, the controller 10 causes the IVRU to re-request the identifier. If valid, the controller accesses the member database 200 and retrieves the current account balance associated with the membership identifier in step S506. In step S507, the controller causes the IVRU 20 to prompt the player for the telephone number of the party to be called, and in step S508, causes the IVRU 20 to notify the player (caller) of the current account balance, for example, in minutes or money.

In some embodiments of the present invention there may be restrictions placed on the telephone time awarded to a player. For example, the telephone time may only be usable to call one or more specific parties or telephone numbers. In such an embodiment the player may be asked to provide the party or telephone number that the player intends to call using the telephone time, e.g., when the player starts playing a slot machine or signs up for the slot club. Telephone minutes may also be earned for 900 number calls (e.g. horoscope hotlines) and be redeemable only for specified 900 numbers. In addition to the number to be called, telephone time restrictions may comprise, for example, limitations which specify (i) where the telephone time can be redeemed from (e.g. a casino hotel room), (ii) which area code(s) may be called, (iii) which geographic areas may be called, and (iv) what time of day, week, month, or year the telephone call may be placed. Other types of restrictions on the redemption of awarded telephone time will be obvious to one of ordinary skill in the art.

In step S509 (FIG. 5*b*), the controller 10 then causes, via the telephone switch 40, the connection between the caller and the called party to be made, and in step S510, the controller 10 monitors the telephone connection and the account balance, which is continuously debited to reflect the current duration (or cost) of the call. If the account balance reaches zero in step S511, or if either party disconnects the call in step S512, the connection is discontinued in step S513. Otherwise, if the account balance is not zero and the call has not been discontinued, the subroutine returns to step S510 to continue monitoring the call. After the telephone connection is discontinued in step S513, the controller 10 in step S514 adjusts the current account balance, if necessary, and in step S515, creates a record of the call in the call records database 300. The subroutine ends in step S516.

It will be appreciated that a player may utilize his free telephone time without actually having the player card in his possession. He need only have available to him his account number or identifier number or another identifier recognized by the system of the present invention, and the telephone number required to call into the telephone service provider.

In an alternative embodiment, instead of a slot machine network, the controller 10 is connected to a computerized travel service network or any service network where points are awarded to members as an incentive for using the service. In this embodiment, the travel service network passes the traveler's membership card identifier to the controller, which in turn allocates free telephone time to a data record associated with the traveler's membership identification in its member database 200. The amount of telephone time is now based on usage of the traveling service and other parameters, such as the number of miles traveled, mode of transportation, and the like. The traveler can then use his travel card as a prepaid phone card in the same way as the slot card as described above.

There are many other embodiments which may be practiced without departing from the spirit and scope of the invention. For example, in one alternate embodiment a player may register to earn free telephone time for usage of a slot machine with a party other than a casino. A player may register, for example, with a telephone service provider. The telephone service provider in such an embodiment may communicate with participating casinos to obtain the data necessary to evaluate the player's usage of slot machine and to provide a reward of telephone time to the player. In such an embodiment the player may earn telephone time by playing at more than one casino. The participating casinos may at least in part reimburse the telephone provider for the cost of the telephone time awarded to a player.

In another alternate embodiment the time earned by a player may comprise cellular telephone time or pager air time. In an embodiment involving a rechargeable cellular telephone, the controller 10 or a slot machine may add earned telephone time directly to the cellular telephone or to an account associated with the cellular telephone instead of or in addition to storing the earned telephone time in association with the player's identifier. Such recharging of minutes may be accomplished by docking the cellular telephone to the slot machine or another apparatus capable of recharging the cellular telephone's time or transmitting an indication of the earned telephone time to the cellular telephone via infrared (IR) technology.

In yet another alternate embodiment, a player may earn free bytes for data transfer purposes (e.g. for use in text messaging) or allowances for premium telephone services instead of or in addition to telephone time. For example, a player may earn additional free calls to a telephone directory (e.g. "411" calls) for use on his cellular or home telephone.

In another alternate embodiment of the present invention the telephone time awarded to a player may be applied to an outstanding or future telephone bill associated with the player, instead of or in addition to being available for usage as prepaid telephone time. For example, a player may enter his home telephone or cellular account number when playing a slot machine or registering for a slot club. As the player earns telephone time or currency redeemable for telephone time, such telephone time or currency is applied to a telephone bill associated with the player in order to reduce the amount the player has to pay the telephone service provider associated with the bill. In such an embodiment the casino may communicate with the telephone service provider associated with the player in order to reimburse the telephone service provider for an amount of telephone time or currency that the player owes. Further, in such an embodiment a current telephone bill of a player may be obtained and displayed to the player while the player is playing a slot machine, with the reductions due to the usage of the slot machine also being displayed to the player as they are earned.

Some embodiments of the present invention may entail associating a player with another player. For example, two or more players may form an association (e.g. a "buddy list") wherein the telephone time earned by either of the players is pooled into a common balance of telephone time that is redeemable by any of the players. Alternatively, telephone time may be pooled together from multiple slot machines to form a progressive jackpot, wherein one or more of the players playing at a slot machine contributing to the progressive jackpot may win at least a portion of the progressive jackpot upon the occurrence of a predetermined event (e.g. the player obtains a predetermined outcome on the slot machine or is the player that has played the longest amount of consecutive time).

In such multiple player embodiments players may earn additional benefits. For example, the amount of telephone time earned by a player may be affected by how many of the other players on the subject player's "buddy list" are currently playing. For example, at times when everyone each player associated with a group of players is playing a slot machine each of the players may earn twice as much telephone time as he or she would have if the other players were not playing.

Of course, it will be appreciated that the invention may take forms other than those specifically described, and the scope of the invention is to be determined solely by the following claims.

What is claimed is:

1. An apparatus for awarding telephone time for using a slot machine and for redeeming the telephone time, comprising:

a storage device; and a processor in communication with the storage device, the storage device storing a program for controlling the processor; and the processor operative with the program to:

receive an identifier that identifies a user of a slot machine;

receive an indication of an amount of usage of the slot machine by the user;

award an amount of telephone time based on the amount of usage of the slot machine;

store and accumulating the awarded telephone time in a data record associated with the received identifier;

receive a request from the user to place a telephone call, wherein the request includes the identifier and a telephone number;

establish the telephone call to the telephone number; and debit the amount of awarded telephone time in the data record associated with the identifier based on a cost of the telephone call.

2. A medium encoded with a program for implementing a method, said method comprising the steps of:

receiving an identifier that identifies a user of a slot machine;

receiving an indication of an amount of usage of the slot machine by the user;

awarding an amount of telephone time based on the amount of usage of the slot machine;

storing and accumulating the awarded telephone time in a data record associated with the received identifier;

receiving a request from the user to place a telephone call, wherein the request includes the identifier and a telephone number;

establishing the telephone call to the telephone number; and debiting the amount of awarded telephone time in the data record associated with the identifier based on a cost of the telephone call.

3. A method, comprising:

determining a user identifier that identifies a user of at least one slot machine;

determining usage of the at least one slot machine by the user;

determining an award of telephone time based on the usage of the at least one slot machine;

storing the award of telephone time in association with the user identifier.

4. The method of claim 3, wherein the step of determining a user identifier comprises:

receiving, via a telephone connection, a user identifier that identifies a user of at least one slot machine.

5. The method of claim 4, wherein the step of determining a user identifier comprises:

receiving, via a telephone connection, a slot club identifier that identifies a player of at least one slot machine.

6. The method of claim 3, further comprising:

verifying that the user identifier is valid.

7. The method of claim 3, wherein the step of determining usage of the at least one slot machine comprises:

determining at least one of (i) an amount of time the user played the at least one slot machine, (ii) an amount of wagers the user inserted into the at least one slot machine, (iii) at least one payout obtained by the user while playing the at least one slot machine, and (iv) a number of games played by the user at the at least one slot machine.

8. The method of claim 3, wherein the step of determining usage of the at least one slot machine comprises:

retrieving, based on the user identifier, a data record that indicates the usage of the at least one slot machine.

9. The method of claim 3, wherein the step of determining an award of telephone time comprises:

determining, based on the usage of the at least one slot machine, an amount of at least one of telephone minutes and telephone seconds available to the user.

10. The method of claim 3, wherein the step of determining an award of telephone time comprises:

determining, based on the usage of the at least one slot machine, an amount of currency usable for telephone time.

11. The method of claim 3, wherein the step of determining an award of telephone time comprises:

retrieving, based on the identifier, a data record which stores an indication of an telephone time associated with the user.

12. The method of claim 3, wherein the telephone time is an amount of time for the duration of which a telephone call may be established between the user and at least one other party.

13. The method of claim 3, wherein the step of determining a user identifier comprises:

reading a user identifier from a player tracking card.

14. An apparatus for awarding telephone time for using a slot machine, comprising:

a storage device; and a processor in communication with the storage device, the storage device storing a program for controlling the processor; and the processor operative with the program to:

perform the method of claim 3.

15. A medium encoded with a program for implementing the method of claim 3.

16. A method for redeeming telephone time awarded for using at least one slot machine, comprising:

receiving a request to establish a telephone call, wherein the request includes an identifier that identifies a user and a telephone number to be called;

establishing, based on the telephone number, the telephone call; and adjusting an amount of telephone time associated with the user identifier based on a cost of the telephone call, wherein the telephone time was awarded for usage of at least one slot machine.

17. The method of claim 16, further comprising:

monitoring a duration of the telephone call;

debiting the amount of telephone time based on the duration of the telephone call.

18. The method of claim 17, further comprising:

tracking a remaining amount of telephone time associated with the user identifier during the duration of the telephone call;

determining that the amount of telephone time associated with the user is zero; and disconnecting the telephone call.

19. The method of claim 16, wherein the amount of telephone time associated with the user identifier comprises an amount of currency available as payment for the telephone call, and the step of adjusting comprises:

determining a cost per unit of time for the telephone call;

determining a number of units of time associated with the telephone call;

determining the cost of the telephone call by multiplying the cost per unit of time by the number of units of time; and debiting the cost of the telephone call from the amount of currency available as payment for the telephone call.

20. The method of claim 16, wherein the telephone time was awarded for at least one of (i) an amount of time the user played the at least one slot machine, (ii) an amount of wagers the user inserted into the at least one slot machine, (iii) at least one payout obtained by the user while playing the at least one slot machine, and (iv) a number of games played by the user at the at least one slot machine.

21. An apparatus for awarding telephone time for using a slot machine, comprising:

a storage device; and a processor in communication with the storage device, the storage device storing a program controlling processor; and the processor operative with the program to:

perform the method of claim 16.

22. A medium encoded with a program for implementing the method of claim 16.

* * * * *